March 13, 1962 B. L. BROADWAY 3,024,653
FIREARM TESTING DEVICE
Filed Jan. 23, 1961 2 Sheets-Sheet 1

INVENTOR,
Buford L. Broadway
BY

March 13, 1962     B. L. BROADWAY     3,024,653

FIREARM TESTING DEVICE

Filed Jan. 23, 1961     2 Sheets-Sheet 2

INVENTOR,
Buford L. Broadway

United States Patent Office 3,024,653
Patented Mar. 13, 1962

1

3,024,653
FIREARM TESTING DEVICE
Buford L. Broadway, 1715 Darnell Way,
San Diego, Calif.
Filed Jan. 23, 1961, Ser. No. 84,174
10 Claims. (Cl. 73—167)

This invention relates to certain new and useful improvements in devices particularly adapted for testing firearms, and more particularly adapted to testing firearms of the handarm variety.

There have heretofore been many attempts made to provide devices for holding firearms for testing purposes which are either primarily directed to the testing of the accuracy of the firing of the weapon or are directed independently to the testing of the accuracy of the loading of the ammunition utilized therewith.

One of the principal purposes of the present invention is to provide a firearm testing device which is capable of testing not only the firing accuracy of the firing device, such as a pistol or the like, but is also capable of simultaneously testing the accuracy of the loading of the ammunition which is utilized therewith.

The invention further pertains to a firearm holding device which is readily adaptable for utilization with all models of handfired weapons particularly in the form of pistols ranging from automatics to revolvers and to other forms and types thereof in order to provide for the testing both of the weapons and of the ammunition to be utilized for such test firing. The device is particularly characterized in providing means for analyzing and measuring the accuracy and efficiency of the loading of the ammunition which is used with the particular weapon under test, as well as providing for an accurate test of the accuracy of the weapon in its cast of the missile upon firing.

This is particularly emphasized by the close simulation in the present device of the recoil action upon the weapon approaching the recoil action upon similar weapons when hand held and manually fired, a function which previous testing devices have inherently been incapable of performing on account of their organization and construction.

The principal object of the present invention is to provide a new and novel means for test firing hand weapons such as a pistol.

A further object of the invention is to provide a firearm test stand to indicate comparatively the accuracy and trueness of the function of such firearm.

A further object of the invention is to provide a test stand containing corrective means for the adjustment of drift or lateral movement during test firing of a hand weapon.

A further object of the invention is to provide a firearm testing device having a scale to denote arbitrary comparative explosive power of the ammunition used in such a firearm during the test.

A further object of the invention is to provide a firearm test stand having pitch or vertical adjustment means for test firing a hand weapon.

A further object of the invention is generally to improve the design, construction and efficiency of firearm testing devices.

The means by which the foregoing and other objects of the present invention are accomplished and the manner of their accomplishment will be readily understood from the following specification upon reference to the accompanying drawings, in which.

Figure 1:
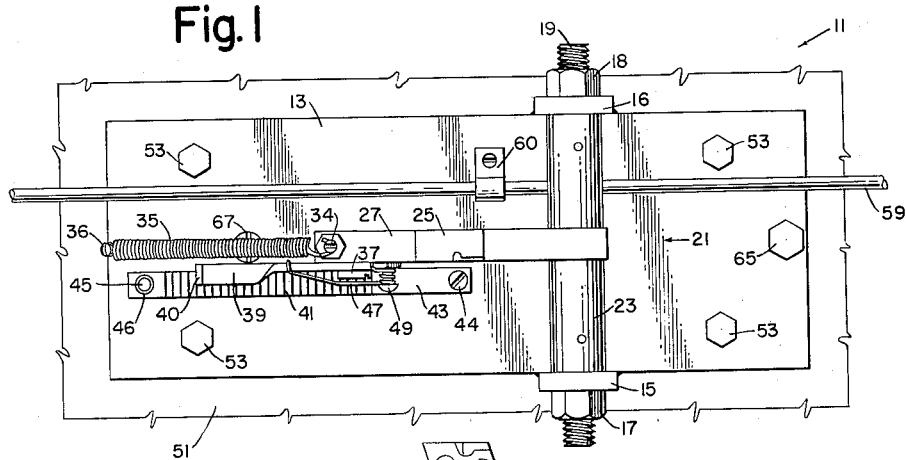
FIG. 1 is a plan view of the preferred embodiment of the present invention.
Figure 2:
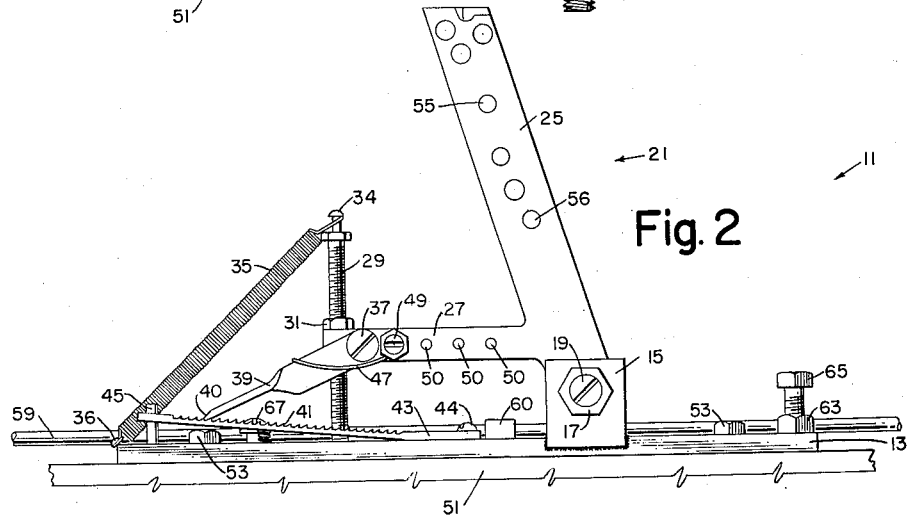
FIG. 2 is a side elevational view of the device as seen in FIG. 1.
Figure 3:
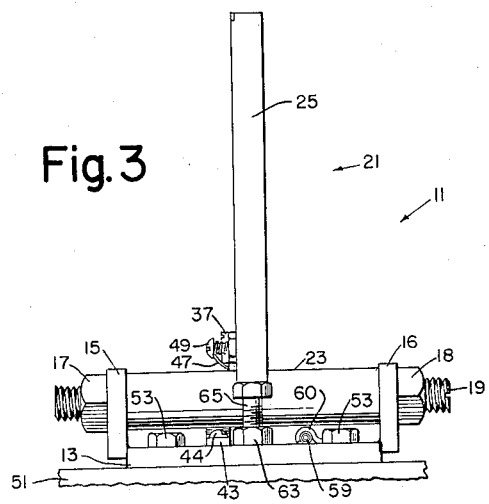
FIG. 3 is a rear end elevational view of the device.

Referring now to the drawings in which the various parts are indicated by numerals, the test stand designated generally by the numeral 11 comprises a substantially rectangular base member 13 provided with oppositely spaced upstanding mounting brackets 15, 16 rigidly attached to the base 13 as by welding or similar suitable means. Carried by the brackets 15, 16 and demountably attached thereto by means of locking nuts 17, 18 is a bearing shaft 19 in substantial parallel spaced relation to the base 13. Upon shaft 19 is mounted the weapon holding fixture 21 comprising a transverse sleeve 23 rotatably journalled on shaft 19, an upright support post 25 rigidly affixed to the sleeve 23, and an arm 27 preferably integrally connected to and projecting forwardly from the support post 25 and in acute angular relation thereto. Carried by and adjustably engaged with the arm 27 at its forward extremity is a vertical adjustment member 29. Preferably member 29 is a screw, threadedly engaged with the arm 27 to provide for incremental vertical adjustment of the position of arm 27 relative to the base 13. The member 29 is preferably additionally provided with lock nuts 31, 33 to maintain the vertical adjustment with relation to the arm 27. Connected to the upper end of the member 29 by means of an anchor pin 34 is a recoil arresting spring 35 extending angularly downwardly to the leading edge of the base platform 13 and secured thereto as by pin means 36. It will be seen that member 29 provides means for establishing accurately the "at rest" position of the weapon holding fixture, and, when a weapon is mounted and held thereon, enables accurate vertical adjustment of the alinement of the weapon.

Preferably pivotally attached to one of the sides of the arm 27 as by a pivot bolt 37 is a pawl 39, which is preferably disposed extending angularly forwardly and having its distal end 40 in seated abutment with one of the teeth 41 of the upper surface of an approximately flat, gently curved resilient toothed rack 43. Rack 43 is preferably longitudinally disposed adjacent the upper face of the base 13 and is rigidly connected to the base 13 at its rearward end as by bolt 44. A stud 45 rigidly secured to the base 13 and projecting upwardly therefrom through an aperture 46 in the forward end of the rack 43 permits the rack limited vertical motion while containing the lateral movement thereof.

The pawl 39 is additionally urged into seated abutment with the rack 43 by a restraining spring 47 in looped attachment with the upper edge of the pawl and convolutely embracing the bolt 49 which is threadedly secured to the arm 27. It will be observed that the arm 27 is further provided with a plurality of substantially evenly spaced threaded holes 50 for alining and adjusting the position of the pawl with respect to various types of hand fired weapons utilizing ammunition of dissimilar explosive content.

Figure 4:
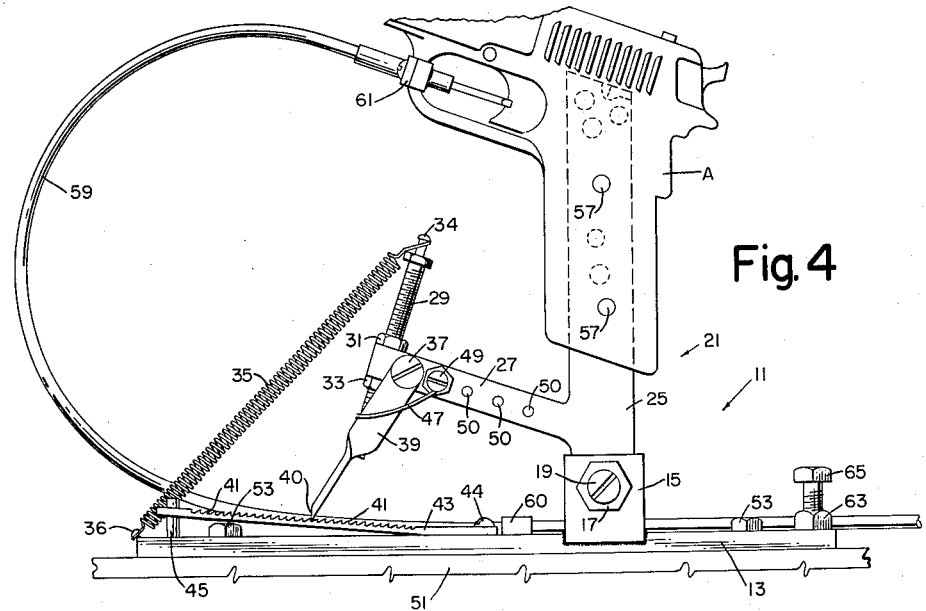
FIG. 4 is a side elevational view of the device with an automatic pistol attached thereto in position after firing of the pistol and with the pistol recoil.

In the use of the preferred embodiment of the invention, the test stand 11 is preferably securely anchored to a suitable bench or table 51, shown here fragmentarily, as by attachment bolts 53. An automatic pistol A fragmentarily shown in FIG. 4 of the drawings with the handle grip plate and the ammunition magazine removed therefrom is mounted to the device as by inserting the gun support post 25 into the magazine storage chamber of the automatic pistol A, the support post 25 being of sufficient dimension and conformation to nest snugly in such chamber. As is well known, and conventional, the automatic pistol is provided with handle grip plates affixed to the pistol frame by bolt means and correspondingly alined threaded apertures. For the testing of the automatic pistol after the weapon has been mounted upon the gun support post 25 the threaded apertures of the frame butt are alined in register with the threaded apertures 55, 56 provided by the support post and rigidly detachably connected thereto as by securing bolts 57. The pistol in the aforementioned condition is test fired either manually or remotely as by urging the plunger in the flexible cable 59 against the trigger of the pistol. The cable 59 is preferably rigidly attached to the base 13 by an arcuately deformed clip 60, and to the pistol trigger guard by detachable rigid clamp means 61.

After the initial test shot has been fired from the weapon at a suitable target (not shown) and vertical adjustment of weapon point is required, this may be accomplished by loosening the nuts 31, 33 and rotating the adjustment pin 29 until the correct vertical alinement is obtained. If the initial test shot is displaced horizontally with relation to the target, the necessary correction may be acquired by unscrewing the train pin lock means 63 detachably threadedly mounted on the train pin 65 and tapping gently on the train pin 65, thus limitedly swinging the device about a pivot pin 67 to accomplish the necessary reciprocal horizontal adjustment of the train of the weapon.

It will be readily observed that after the corrective vertical and horizontal adjustments in point and train have been made the pistol may be discharged until a representative group of shots have been embedded in the target. After each individual firing the arm 27 and the attached pawl member 39 are reset manually to insure the distal end of the pawl 40 seating in a predetermined tooth. It will thus be noted that as each cartridge is fired the recoil of the weapon will cause the pawl 30 to travel rearwardly until the arresting spring 35 overcomes such recoil and stops the rearward movement of the pawl. It will also be seen that after each individual shot is fired the pawl 30 will have travelled rearwardly across a number of teeth 41 on the rack 43. By noting and comparing the number of teeth contained in the travel of the pawl after each firing, the operator of the device is enabled to formulate an arbitrary comparison of any variance in the explosive capacity of the separate cartridges used in the test.

Figure 5:
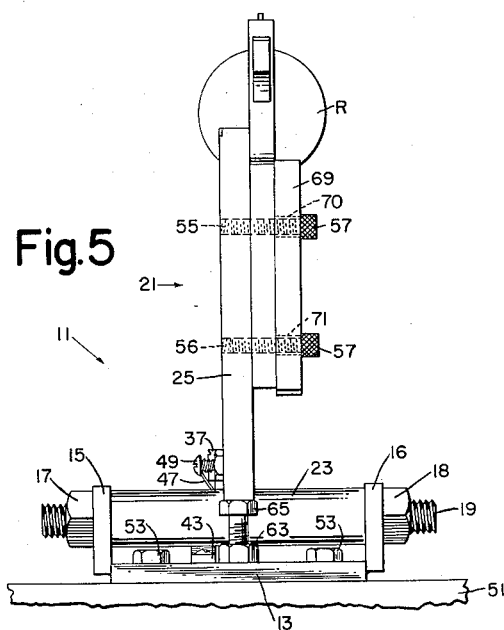
FIG. 5 is a rear end elevational view similar to FIG. 3 and with a revolver attached.
Figure 6:
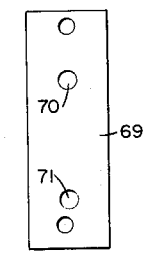
FIG. 6 is a side elevational view of an adaptor plate for use with the device as shown in FIG. 5.

As best shown in FIG. 5 of the drawings, the device of the present invention may be quickly and easily converted to accommodate the testing of revolvers and similar hand fired weapons. A revolver "R," having its butt grip-plates removed, is positioned against one side of the support post 25 in such manner that the threaded apertures 55, 56 provided by the support post 25 are in register with the similar correspondingly threaded apertures in the handle frame of the revolver. Adjacent the opposite side of the revolver handle frame and rigidly detachably mounted thereto as by bolts 57 is an adaptor plate 69 provided with apertures 70, 71 in register with the hand grip apertures of the revolver handle and the apertures 55, 56 of the support post 25. It will thus be observed that with the revolver rigidly sandwiched between the support post 25 and the adaptor plate 69, and firmly wedged therebetween as by the bolts 57, the revolver is capable of withstanding the firing and subsequent recoil action without risk of marring or deforming the revolver handle frame.

It will be understood that the device of the present invention, while shown with one adaptor plate 69, the number of adaptor plates provided may be substantially increased to accommodate the utilization and testing of other revolvers of varying size and style.

It will further be observed that not only does pawl 39 provide an indicator for comparison of the recoil of cartridges under test, but also provides a stop against return of the weapon from recoil to at rest which may easily be released for resetting. Thus slamming of the weapon is avoided, eliminating this possibility of disturbing the vertical setting of alinement and also protecting the frame of the weapon from distortion possibly resultant from an unlimited return.

Another feature which should be especially noticed in connection with the present device is the particular facility with which it handles and operates hand weapons of the magazine type, the same being exemplified by the automatic pistol A shown in the drawings. It will, of course, be understood that there are many other types of magazine type hand weapons other than that schematically exemplified in the drawings.

Insofar as magazine type hand weapons of the type shown as the automatic A in the drawings are concerned, it will be seen that the post 25 may be inserted into the hollow chamber within the butt of the automatic weapon which normally houses the magazine under normal conditions, and when the device is clamped to the support post the danger of undue collapsing of the frame of the weapon is plainly eliminated by the presence of the support post within the magazine chamber.

On other types and styles of automatic weapons, particularly of smaller calibre, and in which the magazine chamber is not of dimensions sufficient to house the support post, one of the adaptors similar to the adaptor shown in the drawings is to be inserted within the magazine chamber, and the weapon with the inserted adaptor is mounted at one side of the support post. In this manner the clamping and rigid fixing of the weapon to the assembly may easily be effective without danger of damaging or collapsing the frame of the weapon.

This is in sharp contrast with prior devices which have contemplated clamping a device at the sides in such manner that it required a great nicety of adjustment in order to prevent the collapse under clamping of the frame of the gun, and consequently leave a great deal of discrepancy in the adjustment of the weapon as far as the point of the weapon was concerned, and other clamping assemblies which clamp the frame of the butt fore and aft in such manner as to tend to collapse the same while not permitting the proper adjustment of the point and/or train of the device.

I claim:

1. A firearm testing device comprising a base member, said base member provided with substantially parallel upstanding brackets, a shaftlike bearing member mounted in said brackets, sleeve means embracing said bearing member and journalled thereto, an upwardly disposed apertured gun support post attached to said sleeve means, a forwardly extended arm secured to said gun support post, said arm carrying adjacent its free end vertical adjustment means for shifting the arm and support post, a pawl member pivotally suspended from said arm, a toothed rack on said base member, spring means detachably connected to said arm and overlying said pawl member urging said pawl member into contact with said toothed rack, said rack longitudinally disposed subjacent to said arm and rigidly attached to said base member to provide a measurement indicator for comparison of the explosive capacity of the separate units of ammunition utilized in the firing of the gun mounted to the aforementioned gun support post.

2. A firearm testing device comprising a base member, said base member provided with substantially parallel upstanding brackets, a shaftlike bearing member mounted in said brackets, sleeve means embracing said bearing member and journalled thereto, an upwardly disposed apertured gun support post attached to said sleeve means, a forwardly extended arm secured to said gun support post, said arm carrying adjacent its free end vertical adjustment means for shifting the arm and support post, a pawl member pivotally suspended from said arm, a toothed rack on said base member, spring means detachably connected to said arm overlying said pawl member, urging said pawl member into contact with said toothed rack, said rack longitudinally disposed subjacent to said arm and rigidly attached to said base member and a recoil arresting spring means connected with and disposed between said arm and said base member.

3. A firearm testing device comprising a base member, said base member provided with substantially parallel upstanding brackets, a shaftlike bearing member mounted in said brackets, sleeve means embracing said bearing member and journalled thereto, an upwardly disposed apertured gun support post attached to said sleeve means, a forwardly extended arm secured to said gun support post, said arm carrying adjacent its free end vertical adjustment means for shifting the arm and support post to adjust the point of a weapon when mounted on said assembly, a pawl member pivotally suspended from said arm, a toothed rack on said base member, spring means detachably connected to said arm overlying said pawl member urging said pawl member into contact with said toothed rack, said rack longitudinally disposed subjacent to said arm and rigidly attached to said base member, recoil arresting spring means connected with and disposed between said base member and said arm, and a plurality of substantially evenly spaced apertures in said arm to effect adjustment of the arm with relation to the support post to compensate for the use of non-uniform calibre weapons and the ammunition used therewith.

4. A firearm testing device comprising a base member, said base member provided with substantially parallel upstanding brackets, a shaftlike bearing member mounted in said brackets, sleeve means embracing said bearing member and journalled thereto, an upwardly disposed gun support post attached to said sleeve means, a forwardly extended arm secured to said apertured gun support post, said arm carrying within its free end vertical adjustment means for shifting said arm and said support post, a pawl member pivotally suspended from said arm, a plurality of evenly spaced pawl adjusting apertures in said arm, a toothed rack on said base, spring means detachably connected to said arm overlying said pawl member urging said pawl member into contact with said toothed rack, said rack longitudinally disposed subjacent said arm and rigidly attached at one end to said base member, recoil arresting spring means connected with and disposed between said arm and said base member, pivot means embedded in the fore-section of said base member and train pin adjustment means located in the aftersection of said base member for the adjustment and correction of any horizontal error in the train of a gun mounted upon the device.

5. A firearm testing device comprising a base member, said base member provided with substantially parallel upstanding brackets, a shaftlike bearing member mounted in said brackets, sleeve means embracing said bearing member and journalled thereto, an upwardly disposed apertured gun support post attached to said sleeve means, similarly apertured adaptor plates to accommodate the mounting of dissimilar weapons between said gun support post and said adaptor plates, bolt means for securing said adaptor plates to said supports with said weapons held firmly therebetween, a forwardly extended arm secured to said apertured gun support post, said arm carrying adjacent its free end vertical adjustment means for adjusting the point position of said support post, a pawl member pivotally suspended from said arm, a plurality of evenly spaced pawl adjusting apertures in said arm, a toothed rack on said base, spring means detachably connected to said arm overlying and urging said pawl member into contact with said toothed rack, said rack longitudinally disposed subjacent said arm and rigidly attached to said base member, recoil arresting spring means connected with and disposed between said arm and said base member, pivot means embedded in the foresection of said base member and train pin adjustment means in the aftersection of said base member for the adjustment and correction of any horizontal error in the train of a gun mounted upon the device.

6. In a device for testing hand weapons and the ammunition used with such weapons, base means, a weapon supporting assembly, means connecting said assembly to said base means for oscillation relative to said base means, said assembly including a mounting post projecting upwardly away from said base means, an arm attached at one end to said post and extending forwardly therefrom, said arm being spaced from said base means, an adjustment member engaged with said arm adjacent its other and forward end, said member being incrementally adjustable relative to said arm and seating at its lower end on said base means, adjustment of said member establishing the point position of said assembly relative to said base means, recoil-resisting tension spring means attached to said member and to said base means, urging said assembly to return to said point position, a pawl swingably mounted on and extending downwardly from said arm, a toothed rack secured to said base means underlying said pawl, the distal end of said pawl engaging said rack to limit return movement of said assembly, spring means engaging said pawl and urging said pawl toward rack engagement, means for attaching a hand weapon to said post, and means for firing a hand weapon when so attached creating a recoil, said recoil moving said weapon away from said point position against the action of said recoil resisting spring means, said pawl under said recoil shifting rearwardly along said rack and stoppingly engaging said rack upon completion of said recoil, shift of said pawl relative to said rack indicating the relative force of said recoil, rack engagement by said pawl preventing return of said assembly to said point position.

7. In a device for testing hand weapons and the ammunition used with such weapons, base means, a weapon supporting assembly, means connecting said assembly to said base means for oscillation relative to said base means, said assembly including a mounting post projecting upwardly away from said base means, an arm attached at one end to said post and extending forwardly therefrom, said arm being spaced from said base means, means associated with said arm establishing the point position of said assembly relative to said base means, recoil-resisting tension spring means connected with said assembly and to said base means, urging said assembly to return to said point position, a pawl swingably mounted on and extending downwardly from said arm, a toothed rack secured to said base means underlying said pawl, the distal end of said pawl engaging said rack to limit return movement of said assembly, spring means engaging said pawl and urging said pawl toward rack engagement, means for attaching a hand weapon to said post, and means for firing a hand weapon when so attached creating a recoil, said recoil moving said weapon away from said point position against the action of said recoil resisting spring means, said pawl under said recoil shifting rearwardly along said rack and stoppingly engaging said rack upon completion of said recoil, shift of said pawl relative to said rack indicating the relative force of said recoil, rack engagement by said pawl preventing return of said assembly to said point position.

8. In a device for testing hand weapons and the ammunition used with such weapons, base means, a weapon supporting assembly, means connecting said assembly to said base means for oscillation relative to said base means, said assembly including a mounting post projecting upwardly away from said base means, an arm attached at one end to said post and extending forwardly therefrom, said arm being spaced from said base means, means associated with said arm establishing the point position of said assembly relative to staid base means, recoil-resisting tension spring means attached to said assembly and to said base means, urging said assembly to return to said point position, a pawl swingably mounted on and extending downwardly from said arm, a toothed rack secured to said base means underlying said pawl, the distal end of said pawl engaging said rack to limit return movement of said assembly, spring means engaging said pawl and urging said pawl toward rack engagement, means for attaching a hand weapon to said post for firing to create a recoil, said recoil moving said weapon away from said point position against the action of said recoil resisting spring means, said pawl under said recoil shifting rearwardly along said rack and stoppingly engaging said rack upon completion of said recoil, shift of said pawl relative to said rack indicating the relative force of said recoil, rack engagement by said pawl preventing return of said assembly to said point position.

9. A firearm testing device comprising a base member, a weapon supporting assembly, means connecting said assembly to said base member for oscillation relative to said base member, said assembly including an upwardly disposed apertured gun support post, a forwardly extended arm secured to said gun support post, said arm carrying adjacent its free end vertical adjustment means for shifting the arm and support post, a pawl member pivotally suspended from said arm, a toothed rack on said base member, spring means detachably connected to said arm overlying said pawl member, urging said pawl member into contact with said toothed rack, said rack longitudinally disposed subjacent to said arm and rigidly attached to said base member, and a recoil arresting spring means connected with and disposed between said arm and said base member.

10. A firearm testing device comprising a base member, a weapon supporting assembly, means connecting said assembly to said base member for oscillation relative to said base member, said assembly including an upwardly disposed apertured gun support post, a forwardly extended arm secured to said gun support post, a pawl member pivotally suspended from said arm, a toothed rack on said base member, spring means detachably connected to said arm overlying said pawl member, urging said pawl member into contact with said toothed rack, said rack longitudinally disposed subjacent to said arm and rigidly attached to said base member, and a recoil arresting spring means connected with and disposed between said arm and said base member.

References Cited in the file of this patent

UNITED STATES PATENTS

| 2,582,140 | Leek | Jan. 8, 1952 |
| 2,731,829 | Wigington et al. | Jan. 24, 1956 |